(12) United States Patent
Keshavaraj

(10) Patent No.: US 6,883,827 B2
(45) Date of Patent: Apr. 26, 2005

(54) MODULAR AIR BAG CUSHION SYSTEM

(75) Inventor: Ramesh Keshavaraj, Peachtree City, GA (US)

(73) Assignee: Milliken & Company, Spartanburg, SC (US)

( * ) Notice: Subject to any disclaimer, the term of this patent is extended or adjusted under 35 U.S.C. 154(b) by 271 days.

(21) Appl. No.: 10/138,982

(22) Filed: May 3, 2002

(65) Prior Publication Data

US 2003/0205888 A1 Nov. 6, 2003

(51) Int. Cl.$^7$ .............................................. B60R 21/22
(52) U.S. Cl. ................................................... 280/730.2
(58) Field of Search ...................................... 280/730.2

(56) References Cited

U.S. PATENT DOCUMENTS

| | | | | |
|---|---|---|---|---|
| 5,044,663 A | * | 9/1991 | Seizert | 280/730.1 |
| 5,094,475 A | * | 3/1992 | Olsson et al. | 280/730.2 |
| 5,114,180 A | * | 5/1992 | Kami et al. | 280/743.1 |
| 5,533,755 A | | 7/1996 | Nelsen et al. | 280/743.1 |
| 5,909,895 A | * | 6/1999 | Iino et al. | 280/743.1 |
| 5,913,536 A | * | 6/1999 | Brown | 280/730.2 |
| 5,989,660 A | * | 11/1999 | Moriwaki et al. | 428/35.2 |
| 6,010,149 A | * | 1/2000 | Riedel et al. | 280/730.2 |
| 6,135,493 A | * | 10/2000 | Jost et al. | 280/730.2 |
| 6,237,941 B1 | | 5/2001 | Bailey et al. | 280/730.2 |
| 6,336,654 B1 | * | 1/2002 | Stein et al. | 280/730.2 |
| 6,390,502 B1 | * | 5/2002 | Ryan et al. | 280/743.2 |
| 6,457,740 B1 | * | 10/2002 | Vaidyaraman et al. | 280/730.2 |
| 6,460,877 B1 | * | 10/2002 | Tanabe et al. | 280/729 |
| 6,460,879 B1 | * | 10/2002 | Tanase et al. | 280/730.2 |
| 6,530,594 B1 | * | 3/2003 | Nakajima et al. | 280/730.2 |
| 6,554,314 B1 | * | 4/2003 | Uchiyama et al. | 280/730.2 |
| 6,619,690 B1 | * | 9/2003 | Tanase et al. | 280/730.2 |
| 2001/0030416 A1 | * | 10/2001 | Tanabe et al. | 280/743.1 |
| 2002/0105173 A1 | * | 8/2002 | Saderholm et al. | 280/730.2 |
| 2003/0006590 A1 | * | 1/2003 | Aoki et al. | 280/730.2 |
| 2003/0011175 A1 | | 1/2003 | Hess et al. | 280/730.2 |
| 2003/0030262 A1 | * | 2/2003 | Keshavaraj | 280/743.1 |
| 2003/0052477 A1 | * | 3/2003 | Challa et al. | 280/730.2 |
| 2003/0116946 A1 | * | 6/2003 | Roos | 280/730.2 |
| 2003/0116947 A1 | * | 6/2003 | Yokoyama et al. | 280/730.2 |
| 2003/0141708 A1 | * | 7/2003 | Enders | 280/730.2 |
| 2003/0178820 A1 | * | 9/2003 | Green et al. | 280/730.2 |
| 2003/0178824 A1 | * | 9/2003 | Ogata | 280/730.2 |

* cited by examiner

Primary Examiner—Charles T. Jordan
Assistant Examiner—Jordan Lofdahl
(74) Attorney, Agent, or Firm—Terry T. Moyer

(57) ABSTRACT

A modular airbag cushion system adaptable to different vehicle platform configurations comprises i) a plurality of separate, interconnectable inflatable airbag cushions each of which comprises at least one port for transmitting gas; ii) an optional connector for transmitting gas comprising a tube having a coaxial opening at at least one end, said tube being between and connected with at least two of said airbag cushions to provide a gas-tight connection between said ports; and iii) a gas source in communication with at least one of said ports for inflating said cushions in response to a signal. By varying the length of the connector or the ports, the system can be adapted to a variety of vehicle configurations using cushions of essentially the same length to protect outboard vehicle occupants from injurious contact with exposed interior sides of the vehicle in a crash.

18 Claims, 3 Drawing Sheets

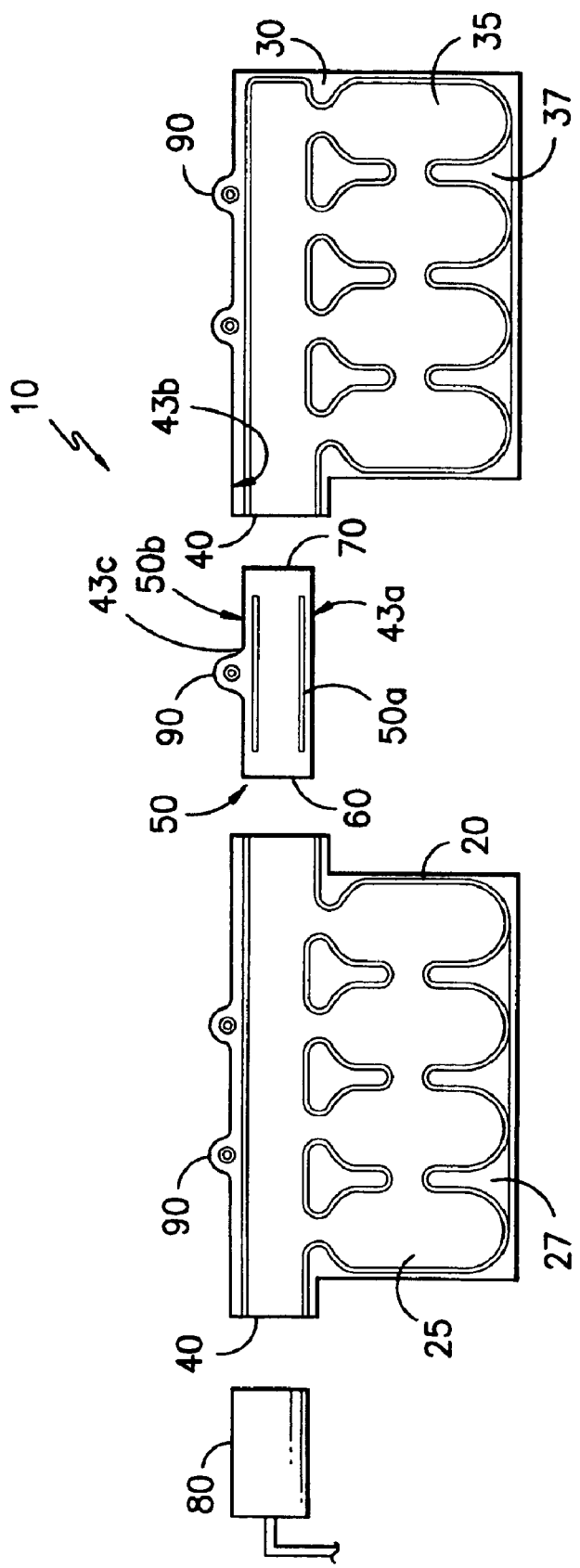
FIG. -1-

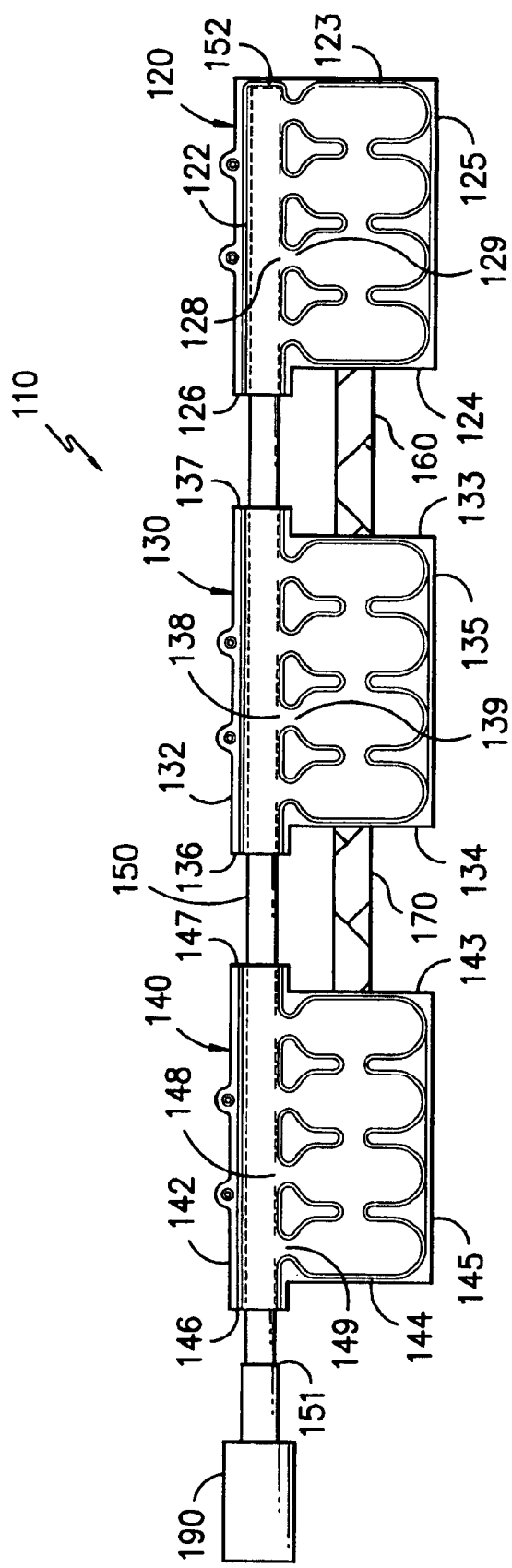
FIG. -2-

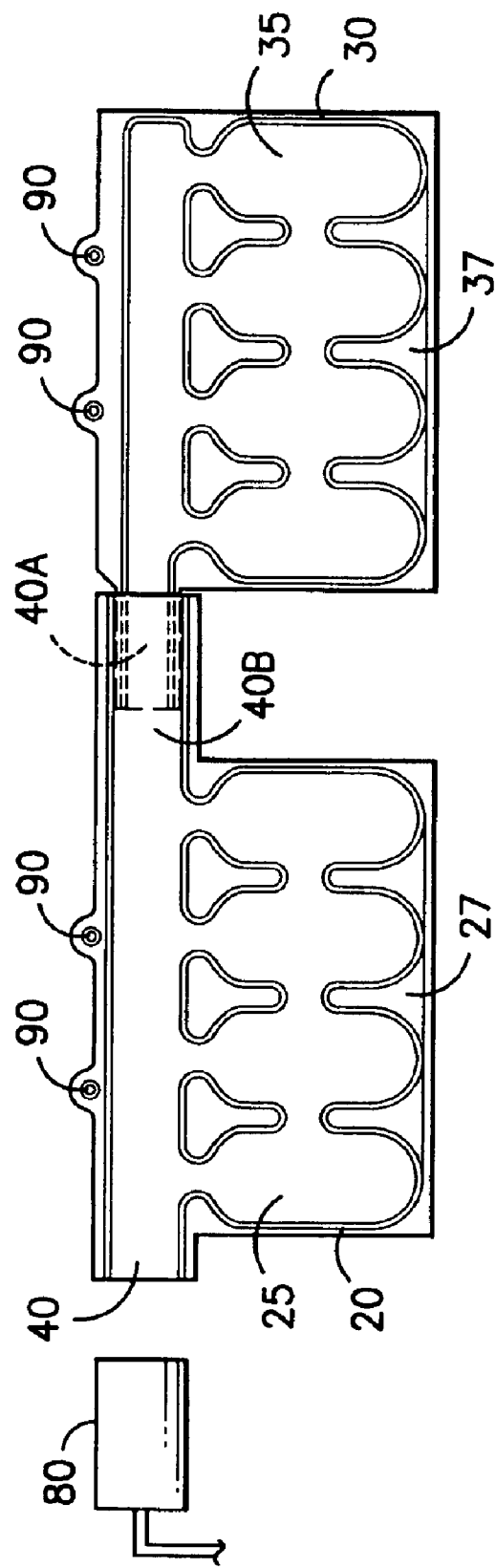
FIG. -3-

MODULAR AIR BAG CUSHION SYSTEM

FIELD OF THE INVENTION

The present invention relates generally to vehicle occupant restraint cushions and more particularly to a simplified inflatable modular airbag cushion system comprising cushion modules and a substantially tubular connector.

BACKGROUND OF THE INVENTION

An inflatable cushion disposed within a supporting structure such as a dash panel, side door or other fixed portion of a car body in opposing relation to a seat in the vehicle plays an important role in protecting the occupants of a vehicle from injury due to collision against the car body. Typically, the inflatable cushion is inflated rapidly by the pressure of a reaction gas released from an inflator during a collision. This gas generation typically takes place when a gas-generating agent in the inflator induces a chemical reaction by a collision signal from a collision-detecting sensor when the deceleration of the vehicle exceeds a certain level. The gas which is generated by the generator is then conveyed to the inflatable cushion which expands outwardly as it fills with gas to create a protective barrier between the vehicle occupant and the dash panel or other portion of the vehicle body/internal surface against which the occupant might otherwise be thrown.

To elaborate, inflatable protective cushions used in passenger vehicles are a component of relatively complex passive restraint systems. The main elements of these systems are: an impact sensing system, an ignition system, a propellant material, an attachment device, a system enclosure, and an inflatable protective cushion. Upon sensing an impact, the propellant is ignited causing an explosive release of gases filing the cushion to a deployed state that can absorb the impact of the forward movement of a body and dissipate its energy by means of rapid venting of the gas. In the undeployed state, the cushion is stored in or near the steering column, the dashboard, in a door, in the back of a front seat, or in a vehicle roof rail, placing the cushion in close proximity to the person or object it is to protect.

Inflatable cushion systems, commonly referred to as air bag systems, have been used in the past to protect both the operator of the vehicle and passengers. Systems for the protection of the vehicle operator have typically been mounted in the steering column of the vehicle and have utilized cushion constructions directly deployable towards the driver. These driver-side cushions are typically of a relatively simple configuration in that they function over a fairly small well-defined area between the driver and the steering column. One such configuration is disclosed in U.S. Pat. No. 5,533,755 to Nelsen et al., the teachings of which are incorporated herein by reference.

The steering column mounted airbags, while effective in front impact collisions, cannot protect an occupant from many other types of crashes. Side impact airbags are notable for being of more complicated designs. Not only does a different type of area need to be protected, but the area varies greatly depending upon the automobile model. Furthermore, accidents may cause a vehicle to flip or roll, requiring that an occupant be protected from most vehicle surfaces in which they can come into contact with, or in some cases protect against gaps in the vehicle surface such as open windows.

To add to the difficulties in protecting an occupant in the case of a vehicle rollover, the time involved in rollover impacts is much greater than the time involved in impact collisions. In an impact collision the time in which an airbag deploys and an occupant hits the airbag is fractional, and as a necessary result, the deflation properties of the bag must be sufficient to minimize injury. However, the same deflation properties in a bag designed to protect in a rollover scenario are undesirable, as the time between vehicle collision and the occupant impacting with the air bag in a rollover are typically many times greater than in a straight collision. Thus an airbag for protecting the occupant in rollover situations has to stay inflated for a much longer time compared to traditional airbags. As a result of this requirement, typical manufacturing methods of sewing fabric panels to a desired shape are undesirable inasmuch as leakage of gas between fabric layers and the sewn seams is excessive for rollover applications. Airbags comprising weldable composite materials having a fabric layer and a thermoplastic layer tend to be useful in rollover applications, but expensive. Accordingly, it would be desirable to minimize the use of such composite materials, where permissible.

Inasmuch as certain areas within the interior of a vehicle are highly unlikely to involve interaction with occupants during a crash, an opportunity arises to reduce costs associated with airbag systems. Localizing the cushioned portions of the system to those areas within the interior expected to impact occupants in a crash can further reduce system costs. An example of such a system is disclosed in U.S. Pat. No. 6,237,941 to Bailey et al., incorporated herein by reference, which employs a side impact or rollover protection restraint system comprising an air bag of sufficient length to extend from a vehicle A-pillar across a B-pillar and secured proximate a C-pillar. The system distributes inflation gas to the air bag through a flexible tube having a plurality of distributed openings along the length of the airbag. The airbag is bonded or sewn shut so that it will not be inflated in regions such as the back of the front seat or the B-pillar where injurious contact with a vehicle occupant is not expected. Although such a system reduces the amount of gas needed to inflate the bag and associated costs, the uninflatable region of the bag is nevertheless constructed of the same costly composites of fabric and thermoplastic as the inflatable region. Moreover, such air bags themselves must be custom designed to conform to a specific vehicle platform configuration, taking into consideration the number of side windows, side pillars, the presence of a third row of seating, etc.

Difficulties encountered in adjusting an airbag cushion system to differences between vehicle models become more pronounced when attempting to protect whole volumes of space in the event of a vehicle rollover, compared to, say, an airbag system deployed in front end collisions. Creating individualized airbags for every model of vehicle is expensive and might be cost prohibitive, especially for lower priced vehicle lines, not only in the design and manufacture of the airbag itself, but in installation costs as well. This would result in many vehicles not having sufficient airbag protection. Moreover, single airbag curtains can impede rescue efforts by hindering access to the vehicle interior, especially where the airbag maintains inflation after deployment.

Given the foregoing, it would be desirable to provide an airbag system that can protect a variety of internal vehicular surfaces, for a variety of different types of collisions, easy to manufacture and install, which minimizes the use of expensive composite containing fabric layer and weldable thermoplastic layer in areas which do not require cushioning during deployment of the airbag system. Moreover, it would be useful to provide a system that offers enhanced accessibility of the vehicle interior to rescue personnel after deployment.

SUMMARY OF THE INVENTION

The present invention relates to improved airbag systems that can be adapted to a variety of vehicle platform configurations.

In one aspect, the present invention relates to a modular airbag cushion system adaptable to different vehicle platform configurations comprising i) a plurality of separate, interconnectable inflatable airbag cushions each of which comprises at least one port for transmitting gas; ii) a connector for transmitting gas comprising a tube having a coaxial opening at at least one end, said tube being between and connected with at least two of said airbag cushions to provide a gas-tight connection between said ports; and iii) a gas source in communication with at least one of said ports for inflating said cushions in response to a signal.

In a preferred embodiment of the invention, the cushions each have an upper margin securable to a vehicle roof rail, a front side margin, a rear side margin and a lower margin.

In still another preferred embodiment of the system of the present invention, each of the cushions upon inflation prevents a vehicle occupant from contacting an interior surface, said system being configurable to a specific vehicle platform by providing a non-inflatable interconnecting panel between said side margins of adjacent cushions, of a length sufficient to cover vehicle surfaces which are not designed to contact vehicle occupants in a crash, and capable of transmitting a tensioning force along a plurality of said cushions.

BRIEF DESCRIPTION OF THE DRAWINGS

FIG. 1 depicts a schematic of a preferred embodiment of the modular airbag cushioning system of the present invention.

FIG. 2 depicts a schematic of a preferred embodiment of the modular airbag cushioning system of the present invention wherein the cushions are interconnected with a panel which is a strap.

FIG. 3 depicts a schematic of an alternate embodiment of the modular airbag cushioning system of the present invention.

DESCRIPTION OF THE PREFERRED EMBODIMENTS

Reference is now made to FIG. 1 which illustrates an exploded view of the major components of a modular impact/rollover airbag cushioning system generally shown as 10 which is adaptable to different vehicle platform configurations comprising i) a plurality of separate, interconnectable, inflatable airbag cushions 20 and 30 each of which comprises at least one port 40 for transmitting gas; ii) a connector 50 for transmitting gas comprising a tube having a coaxial opening at at least one end, 60 and 70, said tube being between and connected with at least two of said airbag cushions to provide a gas-tight connection between the ports; and iii) a gas source 80 in communication with at least one of said ports for inflating said cushions in response to a signal. Optional attachment points 90 are provided along the upper margin of the cushions and connector in sufficient number to properly secure the system to the roof rails of a vehicle or some other suitable attachment point in the vehicle. The cushions contain at least one inflatable zone 25 and 35 and optional non-inflatable zones 27 and 37, the latter serving to provide the proper shape to the inflated cushion whilst reducing the amount of inflating gas required.

FIG. 2 depicts an unexploded version of FIG. 1 (showing the system as assembled) and further depicting an additional cushion to provide coverage from an A-pillar to a D-pillar of a vehicle accommodating three rows of seating. The system provides protection along one side of a vehicle interior for an occupant of any of the three rows of seating. Moreover, the embodiment set out in FIG. 2 utilizes a single connector 50 to connect more than two cushions. More particularly, the modular impact/rollover airbag cushioning system generally shown as 110 comprises i) plurality of separate, interconnectable inflatable airbag cushions 120, 130 and 140. Each of said cushions have: an upper margin 122, 132 and 142 securable to a vehicle roof rail, a front side margin 123, 133 and 143, a rear side margin 124, 134 and 144 and a lower margin 125, 135 and 145. Cushion 120 is a terminal cushion, i.e., it has a single port 126 for transmitting gas which is an inlet. Cushions 130 and 140 are intermediate cushions, each having at least two ports for transmitting gas, at least one of which is an inlet, 136 and 146, and at least one of which is an outlet, 137 and 147. Gas inlet 146 is configured to connect to a conventional gas generating device 190 responsive to a signal as is known by those skilled in the art. The gas generating device is in communication with a connector 150 which comprises a tube 50a having a coaxial opening 151 at one end. The tube 50a may be either rigid or flexible and can be made of metal, plastic or fabric.

In one embodiment (see FIG. 1), the connector comprises a rigid tube 50a within a flexible tube 50b. In such instances the connector 50 can be sealably connected to the cushion by said rigid tube 50a extending within both said flexible tube 50b and the cushion (with the flexible tube 50b remaining outside the cushion).

The connector may comprise either a relatively short tube 50 as depicted in FIG. 1 which connects adjacent ports of a pair of airbag cushions or a longer tube wherein more than one pair of cushions, e.g., all of said cushions, are interconnected by a single tube as shown in FIG. 2. In such instances the tube passes completely along the upper margin within the cushion interior and the tube comprises at least one radial opening 128, 138 and 148, i.e., an opening in the wall of the tube, within the cushion interior, preferably with a plurality of such openings to more effectively distribute the gas into the cushion. Such openings can be made by any suitable method, e.g., drilling or punching. Preferably such openings are in registration with openings 129, 139 and 149 for an inflatable subportion of the cushion to promote effective and rapid distribution of the gas within a cushion upon inflation. In this particular embodiment, the tube can be closed at its back end 152.

The connector is connected with at least two of the airbag cushions to provide a gas-tight connection between the ports. Such gas-tight connection can be effected by securing the junction by cinching with a strap means or band (not shown) or by fusing a portion of the connector to the cushion.

Preferably the upper margin portions 122, 132 and 142 of the cushions extend beyond at least one of the respective two side margins 123 and 124, 133 and 134, and 143 and 144 to provide a cinchable collar which is securable by the strap means. Alternatively, in the embodiment of FIG. 1 where a male connector is joined with a female cushion, the collar is also securable by a strap means.

In a variation of the FIG. 1 joining a female connector with male cushions, the collar is not readily securable by a strap means, but can be joined by alternative methods, such as welding. These welding methods can be used with any embodiment wherein at least one of an adjoining cushion surface and connector surface comprises a thermoplastic polymer layer. Such polymer layers 43a and 43b (see FIG. 1) can be applied to the respective surfaces by extrusion, coextrusion or coating. Thus, a connector can comprise an outer surface layer (i.e. such as layer 43a), e.g., a fabric layer 43c, that is weldable to at least one of the thermoplastic polymer layers of the cushions. The aforementioned welding techniques can include radio frequency (rf) welding or heat sealing, and can be the same as that used to make the cushion.

In a preferred embodiment, the airbag cushions used in the present invention can comprise two layered composites each comprising a fabric layer 43c and a weldable thermoplastic polymer layer 43b superimposed so that at least a portion of each said polymer layer directly faces the other. In a preferred embodiment of the present system, the connector is positioned between the facing polymer layers.

The system of the present invention in FIG. 2 comprises a non-inflatable interconnecting panel 160 and 170 between cushions 120 and 130, and between cushions 130 and 140, along their respective rear and front side margins. The panel is non-inflatable and is considerably less expensive on a linear basis compared to the cushions which are ordinarily composites of fabric and thermoplastic polymer. In contrast, the panel can be a single layer of fabric having sufficient tensile strength to withstand the forces associated with deployment of the system, yet may be readily cuttable or tearable by rescue personnel seeking access to the vehicle interior. In a preferred embodiment, as shown in FIG. 2, the panel can be a simple fabric strip which is either sewn or welded to the cushions. This arrangement is especially useful in affording ready and maximal access to the vehicle interior from outside the vehicle after the system deploys.

FIG. 3 illustrates an alternative embodiment, similar to that shown in FIG. 2, but which utilizes different connection means for attaching the separate modular cushions together. This embodiment includes a plurality of separate, interconnectable, inflatable airbag cushions 20 and 30, each of which comprises at least one port 40, 40A and 40B for transmitting gas and a gas source 80 in communication with at least one of said ports for inflating said cushions in response to a signal. The cushions 20 and 30 are connected by a male port 40A which is concentrically disposed and sealed within a female port 40B so that the connection allows the passage of gas without allowing significant gas leakage therefrom. Although the male port 40A is shown as being attached to or integrally formed as a part of the cushion 30, and the female port 40B is shown as being attached to or integrally formed as a part of the cushion 20, it is to be understood that the male and female ports may be interchangeable with respect to the cushions. The male and female ports 40A and 40B may be attached together using any suitable means that can withstand the forces associated with rapid inflation of the cushions in a collision event, so long as the attachment means prevents significant gas leakage therefrom. Preferred attachment means include heat welding and rf welding. This embodiment obviates the need for a separate connector member.

The above-described arrangement of components provides an airbag cushioning system wherein each of the cushions upon inflation prevents a vehicle occupant from contacting an interior surface of the vehicle. Moreover, the system is configurable to a specific vehicle platform by providing the above-described non-inflatable interconnecting panel between the side margins of adjacent cushions, of a length sufficient to cover vehicle surfaces which are not designed to contact vehicle occupants in a crash. Also, the panel is capable of transmitting a tensioning force along a plurality of the cushions and thereby assists in providing a balanced deployment of the cushions, e.g., redistributing stresses between the connector(s) and cushions which occur during deployment.

For simplicity of design and economy of manufacture, all of the cushions can be of substantially the same length along their upper margins, or in the case of the intermediate cushions, substantially the same or even identical to one another. Typically, the length of each cushion (as deployed from front to rear of a vehicle) ranges from 15 to 20 inches, preferably about 20 inches.

A great advantage of the present invention resides in the facility with which the system can be modified to fit a specific vehicle platform configuration by simply adjusting the length of the interconnecting panels to conform with vehicle specifications. Of course, certain embodiments of the invention will require tailoring the connector, e.g., in terms of its length and position of its radial opening(s), to conform with the connector's corresponding cushion/panel section, especially in those instances where a single tube is used to connect all the cushions. However, for those embodiments where the connector does not substantially intrude within the cushion such that no radial openings are required in the tube, only the length of the connector need be considered.

The present invention is especially useful in that it can provide a system suitable for use in vehicles having three rows of seating, Such an embodiment can comprise at least three of the above-described cushions, and at least two of the panels having different lengths such that the distances between said cushions when inflated are different.

In one aspect of the present invention, the present system comprises an interconnecting panel and cushions which provide a continuous surface (in a front to rear direction of the vehicle), which upon inflation is obstructed by a vehicle pillar thereby retaining the panel and cushions within the vehicle interior, and consequently the occupants of the vehicle as well. In a preferred embodiment, particularly where the interconnecting panel is a strap, the panel is located at least between the lower portions, say the lower three-quarters or lower half, of the side margins of a pair of adjacent cushions. This reduces or eliminates pivoting out of lower sections of a cushion when it encounters a force from the inside to the outside of the vehicle.

Each of the cushions or panels utilized in these preferred embodiments may be formed from a number of materials including, by way of example only and not limitation, woven fabrics, knitted fabrics, non-woven fabrics, films and combinations thereof. Woven fabrics may be preferred with woven fabrics formed of tightly woven construction such as plain or panama weave constructions being particularly preferred. Such woven fabrics may be formed from yarns of polyester, polyamides such as nylon 6 and nylon-6,6 or other suitable material as may be known to those in the skill in the art. Multifilament yarns having a relatively low denier per filament rating of not greater than about 1–4 denier per filament may be desirable for bags requiring particular good foldability.

In application, woven fabrics formed from synthetic yarns having linear densities of about 40 denier to about 1200 denier are believed to be useful in the formation of the airbag according to the present invention. Fabrics formed from yarns having linear densities of about 315 to about 840 are believed to be particularly useful, and fabrics formed from yarns having linear densities in the range of about 400 to about 650 are believed to be most useful.

While each of the cushions or panels may be formed of the same material, the panels may also be formed from differing materials and or constructions such as, without limitation, coated or uncoated fabrics. Fabrics having permeabilities of about 1–3 CFM per square foot. Fabrics having permeabilities below 2 CFM and preferably below 1 CFM at 124 Pa when measured at a pressure differential of 0.5 inches of water across the fabric in the uncoated state may be preferred. Such fabrics which have permeabilities below 2 CFM which permeability does not substantially increase by more than a factor of about 2 when the fabric is subjected to biaxial stresses in the range of up to about 100 pounds force may be particularly preferred. Fabrics which exhibit such characteristics which are formed by means of fluid jet weaving may be most preferred, although, as noted previously, weaving on jacquard and/or dobby looms also permits seam production without the need for any further labor-intensive sewing or welding operations.

In the event that a coating is utilized on one or more material panels, neoprene, silicone urethanes or disperse polyamides may be preferred. Coatings such as dispersed polyamides having dry add on weights of about 0.6 ounces per square yard or less and more preferably about 0.4 ounces per square yard or less and most preferably about 0.3 per square yard or less may be particularly preferred so as to minimize fabric weight and enhance foldability. It is, of course, to be understood that aside from the use of coatings, different characteristics in various panels may also be achieved through the use of fabrics incorporating differing weave densities and/or finishing treatments such as calendaring as may be known to those in the skill of the art. For rollover cushion applications, which require longer gas retention times, heavier coatings may be preferred, particularly in the range of 1.5 to 3.0 ounces of coating per square yard of fabric, and more preferably 2.0 to 2.5 ounces of coating per square yard of fabric.

In an alternate embodiment, films may be used in place of coatings. Preferred films include polyurethane and polyamides. Films are applied to the fabric either by chemical adhesion means or mechanical (heat) means. In either case, the weight of the film, together with any adhesive, is preferably in the range of 2.4 and 3.0 ounces per square yard of fabric.

While the airbag cushions according to the present invention have been illustrated and described herein, it is to be understood that such cushions may also include additional components such as shape defining tethers, gas vents, and the like as may be known to those in the skill of the art.

While specific embodiments of the invention have been illustrated and described, it is to be understood that the invention is not limited thereto, since modifications may certainly be made and other embodiments of the principals of this invention will no doubt occur to those skilled in the art. Therefore, t is contemplated by the appended claims to cover any such modifications and other embodiments that incorporate the features of this invention.

What is claimed is:

1. A modular airbag cushion system adaptable to different vehicle platform configurations comprising
    i) a plurality of separate, interconnected inflatable airbag cushions each of which comprises at least one port for transmitting gas, wherein said cushions have an upper margin securable to a vehicle roof rail, a front side margin, a rear side margin and a lower margin; and
    ii) a gas inflation source in communication with at least one of said ports for inflating said cushions in response to a signal; and
    iii) a substantially rigid connector comprising a tube having a first end and a second end, said connector having an opening at said first end and an opening at said second end, said connector mating with each said interconnected inflatable airbag cushions, said connector being attached in a coaxial arrangement through at least one port on each of said cushions, said connector passing essentially completely along said upper margin within each cushion interior, and said connector tube including at least one radial opening within each said cushion interior.

2. The cushion system of claim 1 wherein said substantially rigid connector is comprised of a material selected from the group consisting of: metals, plastics, and fabrics.

3. The system of claim 1 wherein one of said cushions is a terminal cushion wherein said port for transmitting gas comprises an inlet adapted to directly receive inflation gases.

4. The system of claim 1 wherein one of said cushions is an intermediate cushion having at least two of said ports for transmitting gas, at least one of which is an inlet and at least one of which is an outlet.

5. The system of claim 1 wherein each of said cushions upon inflation prevents a vehicle occupant from contacting an interior surface, said system being configurable to a specific vehicle platform by providing a non-inflatable interconnecting panel between said side margins of adjacent cushions, of a length sufficient to cover vehicle surfaces which are not designed to contact vehicle occupants in a crash and capable of transmitting a tensioning force along a plurality of said cushions.

6. The system of claim 1 wherein said upper margins of said cushions are of substantially the same length.

7. The system of claim 5 which comprises at least three of said cushions, and at least two of said panels having different lengths such that the distances between said cushions when inflated are different.

8. The system of claim 5 wherein said panel is located between the lower portions of said side margins of said adjacent cushions.

9. The system of claim 5 wherein said panel and cushions provide a continuous surface in a front to rear direction which upon inflation is obstructed by a vehicle pillar thereby retaining said panel and cushions within the vehicle interior.

10. The system of claim 5 wherein said panel consists essentially of a single fabric layer.

11. The system of claim 1 wherein said upper margin extends beyond at least one of said side margins to provide a cinchable collar.

12. The system of claim 1 wherein said connector comprises a rigid tube within a flexible tube.

13. The system of claim 1 wherein said airbag cushions comprise two layered composites each comprising a fabric layer and a weldable thermoplastic polymer layer superimposed so that at least a portion of each said polymer layer directly faces the other.

14. The system of claim 13 wherein said connector comprises an outer surface layer weldable to at least one of said thermoplastic polymer layer of said cushions.

15. The system of claim 14 wherein said outer surface layer comprises fabric.

16. The system of claim 14 wherein said connector is positioned between said facing polymer layers.

17. The system of claim 14 where said polymer layers are coatings and films.

18. The system of claim 12 wherein said connector is sealably connected to said cushion by said rigid tube extending within both said flexible tube and said cushion.

* * * * *